United States Patent [19]
Sumi et al.

[11] 4,424,834
[45] Jan. 10, 1984

[54] ELASTIC SHAPED ARTICLE

[75] Inventors: Takehiko Sumi, Yamato; Masao Harada, Sagamihara; Yoshikazu Iwaya, Yamato, all of Japan

[73] Assignee: Kyoraku Co., Ltd., Kyoto, Japan

[21] Appl. No.: 421,336

[22] Filed: Sep. 22, 1982

[51] Int. Cl.³ ............... D03D 21/00; D03D 35/00; B32B 27/40; B32B 27/06
[52] U.S. Cl. .................. 138/121; 138/137; 428/36; 428/217; 428/424.6; 428/476.9; 428/483
[58] Field of Search ............... 138/120, 121, 122, 137; 428/36, 217, 424.6, 476.9, 483

[56] References Cited
U.S. PATENT DOCUMENTS

| 3,042,736 | 7/1962 | Salisbury | 138/121 |
| 3,401,576 | 9/1968 | Eckels | 138/121 |
| 3,407,102 | 10/1968 | Wilkinson | 138/121 |
| 3,714,311 | 1/1973 | Stefanka | 138/121 |
| 4,045,600 | 8/1977 | Williams | 428/424.6 |
| 4,089,360 | 5/1978 | Böhm | 428/217 |
| 4,259,408 | 3/1981 | Moschter | 428/424.6 |
| 4,382,986 | 5/1983 | Reuben | 428/217 |

Primary Examiner—William R. Dixon, Jr.
Attorney, Agent, or Firm—Armstrong, Nikaido, Marmelstein & Kubovcik

[57] ABSTRACT

An elastic shaped article of a laminated construction of at least two layers, comprising (a) a layer of a soft polyvinyl chloride combining polyvinyl chloride with a plasticizer and (b) a layer of at least one thermoplastic elastomer selected from the group consisting of polyester type elastomers, polyurethane type elastomers, and polyamide type elastomers is useful for production of boots, ducts, hoses, tubes, sealing members, covering members, etc. in various transportation machines, construction machines, industrial machines, machine tools, etc. The elastic shaped article whose component layers are particularly laminated by co-extrusion is molded by the blow molding method. When the plasticizer which is combined with polyvinyl chloride to form the soft polyvinyl chloride has an average molecular weight of at least 700, the produced elastic shaped article excels particularly in oil resistance at elevated temperatures.

16 Claims, 7 Drawing Figures (A)

(B)

(C)

(D)

(E)

ELASTIC SHAPED ARTICLE

BACKGROUND OF THE INVENTION

1. Field of the Invention

This invention relates to an elastic shaped article excelling in numerous physical properties including mechanical strength, thermal resistance, oil resistance, moldability and flexibility, which elastic shaped article is formed of a laminated material of at least two layers, i.e. one layer of soft polyvinyl chloride and one layer of other thermoplastic elastomer.

2. Description of the Prior Art

Heretofore, those ducts, hoses, tubes, sealing members and covering members which are used in transportation machines such as automobiles and motor bicycles, construction machines such as bulldozers, industrial machines such as robots, machine tools, hydraulic machines and pneumatic machines have been manufactured with vulcanized rubbers such as natural rubber and synthetic rubber. These raw materials pose problems due to exhaustibility of natural resources and involvement of a troublesome work of vulcanization. For the sake of the preservation of natural resources and the economization of energy, therefore, development of a new material capable of taking the place of vulcanized rubber has been longed for.

In various industrial fields, therefore, studies are being continued to explore the adoptability of such thermoplastic elastomers as soft polyvinyl chloride which obviate the necessity of vulcanization as the raw material for elastic shaped articles such as automotive boots which have hetetofore been preponderantly manufactured with vulcanized rubbers.

Generally, elastic shaped articles made of soft polyvinyl chloride exhibit high flexibility and enjoy relatively satisfactory elasticity and moldability. Unfortunately, they are inferior to the conventional elastic shaped articles made of vulcanized rubbers in terms of mechanical properties such as tensile strength and tear strength. They also suffer from a disadvantage that their flexibility is gradually impaired as their hardness is degraded with elapse of time. They have failed to find utility in applications which demand these properties. When these elastic shaped articles are used as boots in the steering units of automobiles, for example, they tend to sustain cracks under impacts frequently exerted by flying pebbles and the fitting parts serving to retain the boots in position tend to come out as the boots are gradually deprived of their flexibility. The elastic shaped articles of thermoplastic elastomers are further deficient in thermal resistance and in resistance to oils such as grease, gasoline and rubricants. They have, therefore, suffered from a disadvantage that they are not usable where they are liable to be heated to elevated temperatures or to be smeared with grease, gasoline and lubricants.

Despite the strong demand for the development of an ideal substitute for vulcanized rubbers as the raw material for elastic shaped articles such as boots, ducts, hoses, tubes and other members for use in various machines, there has not yet been perfected any elastic shaped article which excels in various properties such as flexibility, mechanical strength, thermal resistance and oil resistance and, moreover, enjoys high moldability.

SUMMARY OF THE INVENTION

This invention, therefore, has been directed to development of a raw material for the elastic shaped article which excels in mechanical strengths such as tensile strength, impact strength and tear strength, thermal resistance, oil resistance and moldability, retains hardness intact despite aging, and enjoys ideal flexibility.

A primary object of this invention is to provide an elastic shaped article which excels in mechanical strengths, thermal resistance, oil resistance and moldability, retains hardness intact despite aging, and enjoys high flexibility.

Another object of this invention is to provide an elastic shaped article which particularly excels in oil resistance at elevated temperatures.

A further object of this invention is to provide an elastic shaped article possessed of various outstanding physical properties, which can be manufactured by the blow molding method, particularly by the co-extrusion blow molding method.

To accomplish the objects described above and other objects, according to this invention, there is provided an elastic shaped article of a laminated construction of at least two layers, comprising:
 (a) a layer of soft polyvinyl chloride incorporating 30 to 220 parts by weight of a plasticizer per 100 parts by weight of polyvinyl chloride having an average polymerization degree of 800 to 12,000, and
 (b) a layer of at least one thermoplastic elastomer selected from the group consisting of polyester type elastomers, polyurethane type elastomers and polyamide type elastomers.

In case the elastic shaped article is required to excel in oil resistance at elevated temperatures, the plasticizer to be incorporated in the soft polyvinyl chloride layer is required to possess an average molecular weight of at least 700.

DETAILED DESCRIPTION OF THE INVENTION

Figure 1:
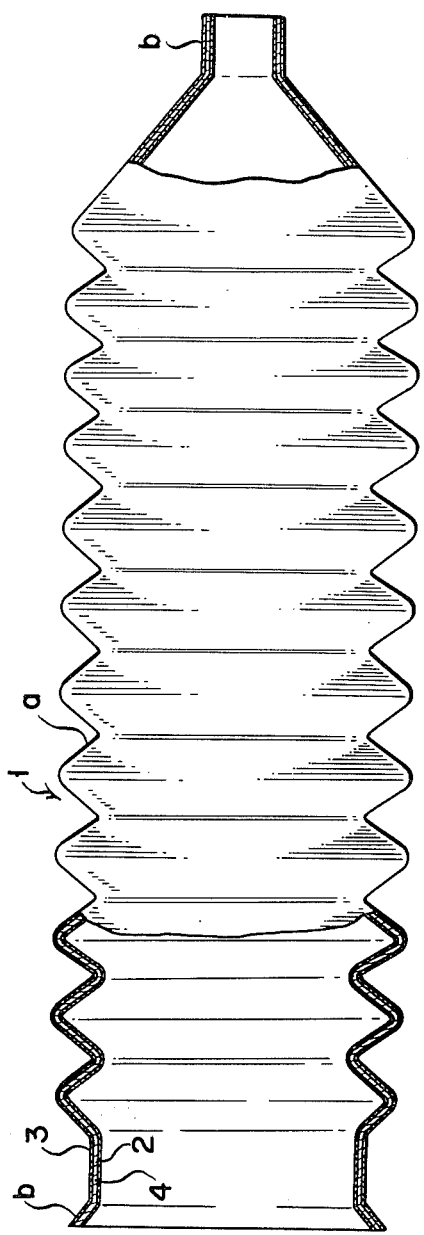
FIG. 1 is a partially cutaway front view of a bellows boot of a three-layer laminated construction of the present invention.
Figure 2:
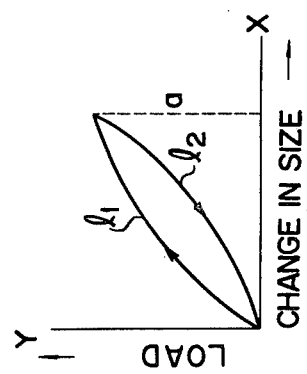
FIG. 2 is a diagram illustrating the hysteresis curve to be used for the measurement of modulus of elastic recovery of bellows.

According to the present invention, as a result of a study in search for effective combination of materials for laminated constructions of soft polyvinyl chloride and other thermoplastic elastomers, it has now been found that an elastic shaped article of a laminated construction of at least two layers, comprising a layer of a soft polyvinyl chloride (hereinafter referred to briefly as "soft PVC") and a layer of at least one thermoplastic elastomer (hereinafter referred to briefly as "TE") selected from the group consisting of polyester type elastomers polyurethane type elastomers, and polyamide type elastomers, excels the conventional elastic shaped articles formed solely of soft PVC in terms of oil resistance and thermal resistance, retains intact the desirable properties inherent in soft PVC, exhibits improvements in mechanical strengths such as tensile strength, impact strength and tear strength, retains its original hardness intact despite aging for a long time, and offers high flexibility persistently. The wonderful combination of outstanding properties thus enjoyed by the elastic shaped article of the present invention is ascribable to the fact that owing to the oil resistance inherently possessed by TE, the TE layer functions as a barrier membrane between the soft PVC layer and an oil for preventing the plasticizer contained in the soft PVC layer from passing into the oil and causing a change in the attributes of the soft PVC and also protecting the soft PVC layer against degradation by the action of the oil and the fact that the high mechanical strengths inherently possessed by TE are conferred upon the laminated construction. By the lamination of the soft PVC layer and the TE layer, therefore, there is obtained an elastic shaped article which excels in oil resistance as well as in mechanical strengths, thermal resistance, moldability and flexibility.

Indeed under the conditions of normal room temperature, the elastic shaped article comprising a layer of soft PVC and a layer of TE as described above exhibits high resistance to oils.

It has been experimentally ascertained that despite the high oil resistance inherently possessed by the TE layer, the elastic shaped article has its resistance to oils degraded under harsh conditions involving an elevated temperature (exceeding 90° C.), for example, when the plasticizer contained in the soft PVC layer has a low molecular weight.

To be specific it has been ascertained that when the elastic shaped article is placed under such harsh conditions involving an elevated temperature, the oil swells the TE layer, the oil now in the swelled TE layer accelerates separation of the plasticizer of a low molecular weight from the soft PVC layer, and the plasticizer in the soft PVC layer passes into the swelled TE layer, with the result that the physical properties inherently possessed by the soft PVC will be degraded and the physical properties inherently possessed by the TE will be impaired. This defect of the elastic shaped article manifests conspicuously, particularly when the TE has good compatibility with the soft PVC in the laminated construction.

A diligent study devoted to the elimination of this defect has led to a discovery that when the plasticizer contained in the soft PVC layer has an average molecular weight of at least 700, the otherwise possible passage of the plasticizer from the soft PVC to the TE is substantially precluded and the oil resistance and other physical properties of the elastic shaped article are retained intact when the article is placed under harsh conditions involving an elevated temperature. For the purpose of obtaining an elastic shaped article which exhibits high oil resistance at an elevated temperature in accordance with this invention, therefore, it is imperative that the plasticizer contained in the soft PVC should possess an average molecular weight of at least 700.

The soft polyvinyl chloride (soft PVC) to be used in the elastic shaped article of the present invention is obtained by combining 100 parts by weight of polyvinyl chloride having an average polymerization degree (P) of 800 to 12,000, preferably 1,300 to 10,000, with 30 to 220 parts by weight, preferably 40 to 200 parts by weight, of a plasticizer. If the average polymerization degree of the aforementioned polyvinyl chloride is less than 800, the mechanical strengths such as tensile strength are less than are desired. If it exceeds 12,000, the parison of the laminate during the blow molding has poor surface conditions and the produced article suffers from extremely poor moldability. If the amount of the plasticizer incorporated in the soft PVC is less than 30 parts by weight based on 100 parts by weight of polyvinyl chloride, the produced shaped article fails to acquire the desired flexibility. If it exceeds 220 parts by weight, the shaped article is notably deficient in mechanical strengths such as tensile strength. In order to ensure the elastic shaped article of this invention to acquire high flexibility and high elastic recovery, the soft PVC which forms one of the layers of the elastic shaped article of this invention is required to possess hardness in the range of 30 to 93 by the Shore A scale. Generally when the amount of the plasticizer incorporated falls in the range mentioned above, the soft PVC incorporating the plasticizer has its hardness falling in the range just mentioned. When the amount of incorporation of a plasticizer is fixed, the hardness of the soft PVC is slightly variable from one kind of plasticizer to another to be incorporated. Thus, the amount of incorporation of a plasticizer is required to be fixed, depending on the particular kind of the plasticizer selected, so that the soft PVC incorporating this plasticizer may possess hardness falling in the aforementioned range. Further, the hardness of the soft PVC is desired to be lower than the hardness of TE which forms the other layer of the laminated construction of the elastic shaped article.

Optionally, the soft PVC may suitably incorporate therein various additives such as filler, stabilizer, stabilizing aid and pigment. Although the soft PVC to be used in this invention is desired to be made up of virgin materials, the virgin materials may adulterated with flashes or fins occurring during the production of the shaped article of this invention to a limited extent in which the effect of the present invention is retained intact.

For incorporation into the soft PVC, any of all the known plasticizers usable for polyvinyl chloride can be adopted without any particular limitation by kind. Examples of the plasticizer usable for this purpose include, but are not limited to: phthalic esters such as dimethyl phthalate, diethyl phthalate, dibutyl phthalate, di-n-octyl phthalate, di-n-decyl phthalate, di-n-lauryl phthalate, diisobuthyl phthalate, dipentyl phthalate, di-2-ethylhexyl phthalate, diisooctyl phthalate, dinonyl phthalate, diisodecyl phthalate, butylbenzyl phthalate, butyloctyl phthalate, methyloleyl phthalate, butyllauryl phthalate, dicyclohexyl phthalate, diallyl phthalate, allyl cyclohexyl phthalate, dimethoxyethyl phthalate and diethoxyethyl phthalate; phosphoric esters such as tributyl phosphate, tributoxyethyl phosphate, tri-2-ethylhexyl phosphate, triisodecyl phosphate, triphenyl phosphate, diphenyldecyl phosphate and diallyl phosphate; aliphatic dibasic esters such as di-2-ethylhexyl adipate, diisodecyl adipate, dicapryl adipate, di-n-octyl adipate, di-3,5,5-trimethylhexyl adipate, dimethoxyethyl adipate, dibutoxyethyl adipate, diisobutyl azelate, di-2-ethylhexyl azelate, dicyclohexyl azelate, di-n-hexyl azelate, dibutyl sebacate, di-2-ethylhexyl sebacate and diethyl sebacate; alicyclic dibasic esters such as di-2-ethylhexyl tetrahydrophthalate, di-n-octyl tetrahydrophthalate and di-2-ethylhexyl hexahydrophthalate; epoxy plasticizers such as epoxidized soybean oil, epoxidized safflower oil, epoxidized cottonseed oil, allyl epoxystearate, ethyl epoxystearate, glycidyl epoxyoleate, glycidyl epoxystearate and epoxystearyl acrylate; other aliphatic esters such as oleic esters, stearic esters, ricinoleic esters and palmitic esters; aromatic carboxylic esters such as benzoic esters, trimellitic esters, pyromellitic esters and trimesic esters; and polyester type plasticizers obtained by the reaction of dibasic acids with glycols and generally further with chain stoppers.

For the purpose of obtaining an elastic shaped article which exhibits high resistance to oils under conditions involving an elevated temperature, it is necessary as already pointed out to incorporate into the soft PVC a plasticizer having an average molecular weight (M) of at least 700, preferably at least 900. For the plasticizer which satisfies this requirement, the amount of incorporation into the soft PVC is the same as described above. If the average molecular weight of the plasticizer is less than 700, the plasticizer contained in the soft PVC layer is dispersed so much as to pass into the TE layer and even exude out of the laminated construction. For the elastic shaped article to possess high resistance to oils under conditions involving an elevated temperature, it is imperative that the average molecular weight of the plasticizer should exceed at least 700.

A plasticizer satisfying this requirement can be selected from among polyester type plasticizers and epoxy type plasticizers.

The polyester type plasticizers have structures wherein monobasic acids or monohydric alcohols seal both ends of chain polyesters as indicated by the following formulas:

wherein, L denotes a monobasic acid (such as caproic acid, capric acid, pelargonic acid, lauric acid or oleic acid), A denotes a monohydric alcohol (medium to higher alcohol such as capryl alcohol, lauryl alcohol, oleryl alcohol or stearyl alcohol), G denotes a glycol (such as 1,2-propylene glycol, ethylene glycol, diethylene glycol, triethylene glycol, 1,3-butanediol, 1,4-butane diol, neopentyl glycol or 1,6-hexane diol), and D denotes a dibasic acid (such as sebacic acid, azelaic acid, adipic acid or phthalic acid).

Examples of the epoxy type plasticizer advantageously usable herein include plasticizers obtained by epoxidizing soybean oil, cottonseed oil, sperm oil, etc.

The thermoplastic elastomer (TE) which is used in the elastic shaped article of the present invention is a high molecular substance which at normal room temperature exhibits elasticity of the kind possessed by vulcanized rubber and which at elevated temperatures is plasticized enough to become moldable. In view of the requirements for adhesiveness to the soft PVC layer, resistance to oils such as grease, gasoline and lubricants, and mechanical strengths such as tensile strength, this thermoplastic elastomer is selected from among polyester type elastomers, polyurethane type elastomers, polyamide type elastomers and combinations of such elastomers.

The polyester type elastomers (hereinafter referred to briefly as "PEE") are multi-block copolymers which have a soft segment preponderantly composed of an aliphatic polyether, an aliphatic polyester, or an aliphatic polyether ester and a hard segment preponderantly composed of a high-melting crystalline aromatic polyester, for example. Theoretically, numerous types of polyester type elastomers may be obtained by varying the kinds and proportions of dibasic acids, glycols, polyesters, and/or polyethers. For example, polytetramethylene terephthalate and polyethylene terephthalate are available as aromatic polyesters and polytetramethylene oxide and polyethylene oxide are available as aliphatic polyethers.

By selecting a polyester type elastomer as TE, there can be obtained an elastic shaped article which excels in oil resistance and elongation and exhibits high adhesiveness to the soft PVC.

The polyurethane type elastomers (hereinafter referred to briefly as "PUE") are obtained by the polyaddition of polyethers or polyesters and diols with diisocyanate. They embrace those products which additionally use triol, diamine, or triamine in the course of the polyaddition. Diisocyanates include 4,4′-diphenylmethane diisocyanate, 4,4′-dicyclohexylmethane diisocyanate, and isophorone diisocyanate; glycols include ethylene glycol, 1,4-butylene glycol, 1,4-hexane diol, bishydroxyethoxy benzene; polyester diols include polyethylene adipate, poly-1,4-butylene adipate, poly-1,6-hexane adipate, polycaprolactone, and polycarbonate; and polyether diols include polyoxytetramethylene glycol.

The polyamide type elastomers (hereinafter referred to briefly as "PAE") are multi-block copolymers which have a soft segment preponderantly composed of an aliphatic polyether, aliphatic polyester, or aliphatic polyether ester and a hard segment preponderantly composed of a polyamide. Theoretically, various types of polyamide type elastomers can be obtained by varying the kinds and proportions of polyamides, polyethers and polyesters. For example, polyamides include polycapramide, polyhexamethylene adipoamide, polyhexamethylene sebacamide, polyundecanamide and polydodecanamide; aliphatic polyethers include polytetramethylene oxide and polyethylene oxide; and aliphatic polyesters include polyethylene adipate, polycaprolactone and polyethylene sebacate.

The TE to be used in this invention is desired to have hardness falling in the range of 60 to 99 on the Shore A scale for the purpose of conferring desired mechanical strengths upon the elastic shaped article.

The elastic shaped article of the present invention is produced by the blow molding technique. This blow molding comprises co-extruding plasticized soft PVC and TE in the form of a multi-layer parison or multi-layer sheet and thereafter giving the parison or sheet a three-dimensional shape by use of positive or negative pressure.

The lamination involved in this case is to give a construction of at least two layers, comprising a layer of soft PVC and a layer of TE. Optionally, the laminated construction may involve three layers, comprising an inner and an outer layer each of TE and an intermediate layer of soft PVC. The elastic shaped article of the present invention is desired to have a laminated construction such that the inner layer or outer layer having the possibility of being exposed to contact with a highly permeable oil will be formed of TE. Optionally, the laminated construction of the present invention may be superposed by an additional layer of a thermoplastic substance or elastomer insofar as the superposition will not appreciable impair the effect of the present invention.

As the means for lamination, the multi-layer blow molding method by means of co-extrusion is used. In this case, the overall wall thickness ratio of the TE layer to the soft PVC layer should fall in the range of 90:10 to 0.5:99.5, preferably 50:50 to 0.5:99.5. When this requirement is fulfilled, the parison is free from the unwanted phenomenon of draw-down and it can be molded advantageously in the shape of the metal cavity. Consequently, the produced elastic shaped article can be expected to acquire uniform wall thickness and exhibit satisfactory elasticity. Besides, the component layers of the elastic shaped article of the present invention have very high interfacial adhesive strength and, therefore, are inseparable from each other. The elastic shaped article having such as laminated construction as described above is desired to possess hardness in the range of 60 to 99 by Shore A scale and elastic recovery of bellows of at least 40%, preferably at least 70%.

FIG. 1 represents a bellows boot as one typical embodiment of the elastic shaped article according to the present invention. In the diagram, a bellows boot 1 has a three-layer laminated construction, comprising an inner and an outer layer 2, 3 each formed of TE and an intermediate layer 4 formed of soft PVC. In the boot, "a" denotes the bellows portion and "b" the connecting end portions.

The bellows boot described above is obtained by preparing the individual layers each of the material mentioned above, co-extruding the layers to form a multi-layer parison, and blow molding this multi-layer parison.

When the elastic shaped article of the present invention is molded in a laminated construction of the three layers, TE/soft PVC/TE, it can be readily bent and elongated with feeble force owing to the high flexibility of the soft PVC. Since the inner and outer layers are both formed of TE, these layers excel in impact resistance, oil resistance, weatherability and tensile strength owing to the properties inherent in TE. Thus, the elastic shaped article very rarely sustains fractures due to impacts of flying pebbles and is not degraded by grease and other oils and fats, ozone, water, hot water and detergents such as are used for washing cars. The elastic shaped article of the three-layer laminated construction enjoys higher tensile strength than the elastic shaped article formed solely of the soft PVC. Further because the soft PVC is protected by the opposed coats (layers) of TE, the elastic shaped article experiences little change of hardness at low temperature and retains its flexibility at low temperatures. Exen at elevated temperatures, it enjoys an effect of minimizing possible deformation under heat.

When the elastic shaped article is produced in a three-layer laminated construction comprising an intermediate layer of soft PVC and an inner and an outer layer each of TE with the proportion of the wall thickness of the soft PVC layer to the total wall thickness of the laminate fixed to exceed 10% and not exceed 99.5%, the shaped article excels in flexibility and enjoys uniform wall thickness. If the wall thickness ratio of the soft PVC layer is less than 10%, the extruded parison suffers from heavy draw-down and the production of shaped article entails high defective molding ratio, making it no longer possible to produce elastic shaped articles of uniform wall thickness stably. Further the elastic shaped article has its flexibility imparied so that the portion thereof to be connected to other fitting member may be divested of its sealability. If the wall thickness ratio of the soft PVC layer exceeds 99.5%, the TE layer fails to form a complete layer where the blow ratio of the shaped article is higher. Consequently, the produced elastic shaped article is deprived of the properties of TE and is liable to sustain pinholes in the course of molding. Thus, the production of shaped article suffers from high defective molding ratio.

When the elastic shaped article is obtained by the blow molding method in a laminated construction of the two layers, soft PVC/TE, the TE layer side of the article maintains impact resistance, oil resistance, and tensile strength at high levels and the PVC layer side maintains flexibility and moldability. Thus, the operation and effect of this elastic shaped article are substantially the same as the aforementioned article of the three-layer laminated construction.

The elastic shaped article according to the present invention is useful for the production of boots, ducts, hoses, tubes, other sealing members, covering members and so on which are expected to possess elasticity and oil resistance so as to be advantageously used in transportation machines such as automobiles and motor bicycles, construction machines such as bulldozers, industrial machines such as robots, machine tools, hydraulic machines and pneumatic machines. Although the elastic shaped article of this invention is primarily molded by the blow molding method, it is not necessarily limited to a tubular shape. Optionally, the elastic shaped article obtained in the tubular shape may be cut into rings, sheets or small pieces each having the laminated construction comprising a layer of soft PVC and a layer of TE and adopted for various uses.

Depending on the particular use to which the elastic shaped article according to the present invention is put, the hardness of the article may be suitably selected without departing from the spirit of the invention. When the elastic shaped article is used in automotive boots such as shock absorber boots, rack and pinion steering gear boots, suspension strut boots and constant velocity joint boots, it acquires high mechanical strengths and high elastic recovery of bellows, the properties ideal for automotive boots, by fixing the hardness of the TE above the level of 60 by the Shore A scale, the hardness of the soft PVC below the level of 87 by the Shore A scale, and the overall wall thickness ratio of the TE layer to the soft PVC layer in the range of 50:50 to 0.5:99.5. Thus, the boots neither sustain cracks under impacts exerted by flying pebbles nor suffer from separation of joined ends owing to loss of elasticity but are permitted to manifest the features of this invention.

Now, the present invention will be described more specifically below with reference to working examples of this invention and comparative experiments. These examples are intended solely for the purpose of illustration and not in the least for the limitation thereof in any way.

EXAMPLE 1

In an extruder having a screw diameter of 50 mm and a screw ratio of length to the diameter (L/D) of 22, soft PVC-(1) and PEE-(1) indicated in Table 1 were melted and kneaded separately. Inside an extrusion die, they were joined as a laminate comprising an outer layer of PEE and an inner layer of soft PVC and coextruded in a cylindrical two-layer parison 40 mm in outside diameter and 2 mm in overall wall thickness (with the wall thickness ratio of the outer layer to the inner layer fixed at 20:80). The extruded parison was tightly enclosed in a split type mold and then blow molded therein with compressed air. Consequently, there was obtained a shaped article comprising a bellows portion and connecting portions formed at the opposite ends of the bellows portion.

The shaped article had a length of 200 mm, a diameter of 60 mm at the ridge and a diameter of 45 mm at the groove respectively of the bellows portion, a pitch of 11.5 mm, and an average wall thickness of 0.7 mm. It had a laminated construction comprising an inner layer of soft PVC and an outer layer of PEE.

Example 2

In the same extruder, soft PVC-(2) and PEE-(2) were melted and kneaded separately. Within an extrusion die, they were joined as a laminate comprising an intermediate layer of soft PVC and an inner layer and an outer layer each of PEE and coextruded in a three-layer parison having an outer-intermediate-inner wall thickness ratio of 10:80:10. This extruded perison was blow molded to afford a shaped article. The shaped article had a three-layer laminated construction comprising an inner layer and an outer layer each of PEE and an intermediate layer of soft PVC.

The specification of the extruder, the dimensions of the parison, and the shape of the shaped article involved in this example were the same as those of Example 1.

EXAMPLE 3

By fllowing the procedure of Example 2, except that soft PVC-(3) and PEE-(3) were used as the materials and the wall thickness ratio of outer, intermediate, and inner layers was fixed at 15:70:15, there was obtained a shaped article. In the present example, the specification of the extruder, the dimensions of the parison and the shape of the shaped article were the same as those of Example 1.

Comparative Experiment 1

A shaped article was obtained by extruding a parison solely of an polyolefinic elastomer shown in Table 1 and then blow molding the parison. The specification of the extruder, the dimensions of the parison and the shape of the shaped article were the same as those of Example 1.

Comparative Experiment 2

A shaped article was obtained by extruding a parison solely of soft PVC-(2) and blow molding the parison of soft PVC. The specification of the extruder, the dimensions of the parison and the shape of the shaped article were the same as those of Example 1.

The shaped articles obtained in Examples 1-3 and Comparative Experiments 1-2 as described above were tested for various properties. The results of the test are shown in Table 2.

TABLE 1

| Kind | Hardness (Shore A) | Composition | Parts by weight |
|---|---|---|---|
| Soft PVC-(1) | 70 | Polyvinyl chloride (polymerization degree 3000) | 100 |
| | | Polyester type plasticizer (polypropylene adipate, molecular weight 2000) | 100 |
| | | Calcium carbonate | 20 |
| | | Epoxidized soybean oil | 3 |
| | | Zinc calcium (heat stabilizer) | 2 |
| Soft PVC-(2) | 78 | Polyvinyl chloride (polymerization degree 2500) | 100 |
| | | DOP (di-2-ethylhexyl phthalate) | 70 |
| | | Calcium carbonate | 20 |

TABLE 1-continued

| Kind | Hardness (Shore A) | Composition | Parts by weight |
|---|---|---|---|
| | | Epoxidized soybean oil | 3 |
| | | Zinc calcium (heat stabilizer) | 2 |
| Soft PVC-(3) | 79 | Polyvinyl chloride (polymerization degree 2500) | 100 |
| | | Rinebole (DL 911P)*[1] | 70 |
| | | Calcium carbonate | 20 |
| | | Epoxidized soybean oil | 3 |
| | | Zinc calcium (heat stabilizer) | 2 |
| PEE-(1) | 96 | HYTREL HTG-5612*[2] | |
| PEE-(2) | 96 | PELPRENE P-70B*[3] | |
| PEE-(3) | 97 | HYTREL HTG-4275*[2] | |
| Polyolefinic elastomer | 78 | TPE 1800*[4] | |

*[1]Rinebole (DL 911P): trademark of Shell Chemical Co. for plasticizer,
*[2]HYTREL HTG-5612 and -4275: trademarks of DuPont Co. for polyester type elastomers,
*[3]PELPRENE P-70B: trademark of Toyobo Co. for polyester type elastomer,
*[4]TPE 1800: trademark of Sumitomo Chemical Co. for polyolefinic elastomer.

TABLE 2

| Properties | Examples | | | Comparative Experiments | |
|---|---|---|---|---|---|
| | 1 | 2 | 3 | 1 | 2 |
| Tensile strength (kg/cm$^2$) | 244 | 268 | 271 | 96 | 165 |
| Elongation (%) | 377 | 432 | 422 | 320 | 282 |
| Tear Strength (kg/mm) | 94 | 115 | 117 | 55 | 49 |
| Pierce strength (kg/mm) | 2.9 | 3.0 | 3.0 | 1.5 | 1.6 |
| Oil resistance | ±0 | ±0 | ±0 | −30 | +6 |
| Thermal resistance (%) | 7.2 | 6.2 | 6.0 | 26.5 | 15.4 |
| Hardness | 83 | 85 | 87 | 91 | 78 |
| Elastic recovery of bellows (%) | 88 | 88 | 85 | — | 69 |

The data of properties obtained of the shaped articles of the working examples and the comparative experiments shown in Table 2 were determined by the following testing methods.

Tensile strength: JIS K-6301 (kg/cm$^2$)
Elongation: JIS K-6301 (%)
Tear strength: JIS K-6301, type B (kg/mm)
Oil resistance: JIS K-6301 (The sample was left standing in oil, No. 1, at room temperature for 10 days and the change of hardness was measured and the value of change was reported.)
Pierce strength:

A part of the wall of each of the shaped articles obtained in the working examples and the comparative experiments was cut off and used as a test piece. The test piece was fastened in position with its periphery attached to a stationary frame containing a circular opening 10 mm in diameter. A needle 1 mm in diameter having its tip rounded with a radius of curvature of 0.5 mm was placed on the test piece and lowered down at a speed of 50±5 mm/min. under the conditions of 20° C. and 65% R.H. The maximum load under which the needle pierced completely through the test piece was measured. The pierce strength was calculated by dividing the value of the maximum load by the wall thickness of the test piece. This testing method is practical for the evaluation of the shaped article where the shaped article is intended for use under harsh conditions such as involving possible exposure to collision of pebbles of sharp edges.

Thermal resistance:

A given shaped article was secured in position by the upper end, with a weight of a fixed load hung down from the lower end thereof. This shaped article was left standing under conditions of an elevated temperature for a stated length of time. The length of the shaped article was measured before and after the standing to find any change in length during the standing as follows:

$$\eta\ (\%) = \frac{l_1 - l_0}{l_0} \times 100$$

wherein

η: change ratio of shaped article,
$l_0$: length of the shaped article after one hour's standing under the load, 100 g, of the weight at 20° C. and 65% R.H.
$l_1$: length of the shaped article after one hour's standing under the load, 100 g, of the weight at 120° C.
Hardness: ASTM D-2240 (Shore A)
Elastic recovery of bellows:

A given shaped article was nipped at one end with a chuck and mounted at the other end on a load cell and was compressed at a rate of 200 mm/min under the conditions of 20° C. and 65% R.H. until all the ridges and grooves of the bellows portion of the article were brought into tight contact. Then the shaped article was drawn out at the same speed to its original shape. During the return, the load was measured. The magnitude of the load as the function of the amount of change in size was plotted as hysteresis curve.

$$\phi\ (\%) = \frac{A_1}{A_0} \times 100$$

wherein,

φ(%): elastic recovery of bellows,
$A_0$: area enclosed with $l_1$, l, and X axis, and
$A_1$: area enclosed with $l_2$, l, and X axis.

The value of φ approaches 100 in proportion as the shaped article nears perfect elasticity. For the shaped article to find a wider range of applications, the excellence in elastic recovery of bellows constitutes an important contribute.

The aforementioned method for testing the elastic recovery of bellows is quite practical for the evaluation of the shaped artile.

It is noted from Table 2 which compares the properties of the shaped articles obtained in the working examples with those obtained in the comparative experiments that the shaped articles formed in the working examples of this invention possessed excellent mechanical strengths such as tensile strength, tear strength, pierce strength and elastic recovery of bellows never attainable by the conventional elastic shaped articles formed solely of soft PVC in Comparative Experiment 2 and that they possessed excellent thermal resistance and oil resistance never attainable by the elastic shaped article formed solely of an ordinary polyolefin type elastomer in Comparative Experiment 1.

EXAMPLE 4

In an extruder having a screw diameter of 50 mm and a screw ratio of lengh to the diameter (L/D) of 22, soft PVC-(1) and PUE-(1) indicated in Table 3 were melted and kneaded separately. Inside an extrusion die, they were joined as a laminate comprising an outer layer of PUE and an inner layer of soft PVC and coextruded in a cylindrical two-layer parison 40 mm in outside diameter and 2 mm in average wall thickness (with the wall thickness ratio of the outer layer to the inner layer fixed at 20:80). The extruded parison was tightly enclosed in a split type mold and then blow molded therein with compressed air. Consequently, there was obtained a shaped article comprising a bellows portion and connecting portions formed at the opposite ends of the bellows portion.

The shaped article had a length of 200 mm, a diameter of 60 mm at the ridge and a diameter of 40 mm at the groove respectively of the bellows portion, a pitch of 11.5 mm, and an average wall thickness of 0.7 mm. It had a laminated construction comprising an inner layer of soft PVC and an outer layer of PUE.

EXAMPLE 5

In the same extruder, soft PVC-(2) and PUE-(2) were melted and kneaded separately. Within an extrusion die, they were joined as a laminate comprising an intermediate layer of soft PVC and an inner layer and an outer layer each of PUE and coextruded in a three-layer parison having an outer-intermediate-inner wall thickness ratio of 10:80:10. This extruded parison was blow molded to afford a shaped article. This shaped article was substantially identical in shape with the shaped article of Example 4 and had a three-layer laminated construction comprising an inner layer and an outer layer each of PUE and an intermediate layer of soft PVC. The specification of the extruder, the dimensions of the parison, and the shape of the shaped article in this example were the same as those of Example 4.

EXAMPLE 6

By following the procedure of Example 5, except that soft PVC-(3) and PUE-(3) indicated in Table 3 as the materials and the wall thickness ratio of outer, intermediate, and inner layers was fixed at 25:50:25, there was obtained a shaped article. The specification of the extruder, the dimensions of the parison, and the shape of the shaped article in this example were the same as those of Example 5.

Comparative Experiment 3

A shaped article was obtained by extruding a parison solely of soft PVC-(2) shown in Table 3 and then blow molding this parison. The specification of the extruder, the dimensions of the parison, and the shape of the shaped article in this example were the same as those of Example 4.

The shaped articles obtained in Examples 4–6 and Comparative Experiment 3 were tested for various properties. The results of the test are shown in Table 4.

TABLE 3

| Kind | Hardness (Shore A) | Composition | Parts by weight |
|---|---|---|---|
| Soft PVC-(1) | 70 | Polyvinyl chloride (polymerization degree 3000) | 100 |
| | | Polyester type plasticizer (polypropylene adipate, molecular weight 2000) | 100 |
| | | Calcium carbonate | 20 |
| | | Epoxidized soybean oil | 3 |
| | | Zinc calcium (heat stabilizer) | 2 |
| Soft | 78 | Polyvinyl chloride (polymer- | 100 |

TABLE 3-continued

| Kind | Hardness (Shore A) | Composition | Parts by weight |
|---|---|---|---|
| PVC-(2) | | ization degree 2500) | |
| | | DOP (di-2-ethylhexyl phthalate) | 70 |
| | | Calcium carbonate | 20 |
| | | Epoxidized soybean oil | 3 |
| | | Zinc calcium (heat stabilizer) | 2 |
| Soft PVC-(3) | 79 | Polyvinyl chloride (polymerization degree 2500) | 100 |
| | | Rinebole (DL 911P) | 70 |
| | | Calcium carbonate | 20 |
| | | Epoxidized Soybean oil | 3 |
| | | Zinc calcium (heat stabilizer) | 2 |
| PUE-(1) | 90 | ELASTOLLAN E-590*[(1)] | |
| PUE-(2) | 85 | ELASTOLLAN E-585*[(2)] | |
| PUE-(3) | 90 | ELASTOLLAN E-390*[(3)] | |

*[(1)]–*[(3)]ELASTOLLAN E-590, E-585, E-390: trademarks of Japan Elastollan Co. for polyurethane type elastomer.

TABLE 4

| Properties | Examples | | | Comparative Experiment |
|---|---|---|---|---|
| | 4 | 5 | 6 | 3 |
| Tensile strength (kg/cm$^2$) | 251 | 273 | 295 | 165 |
| Elongation (%) | 395 | 460 | 380 | 282 |
| Tear strength (kg/mm) | 107 | 98 | 105 | 49 |
| Pierce strength (kg/mm) | 4.7 | 4.7 | 5.5 | 1.6 |
| Oil resistance | ±0 | +1 | +1 | +6 |
| Thermal resistance (%) | 7.4 | 6.8 | 6.3 | 15.4 |
| Hardness | 85 | 82 | 84 | 78 |
| Elastic recovery of bellows (%) | 88 | 90 | 87 | 69 |

EXAMPLES 7-10 AND COMPARATIVE EXPERIMENTS 4

In an extruder having a screw diameter of 50 mm and a screw ratio of length to the diameter (L/D) of 22, a varying thermoplastic elastomer indicated in Table 5 was melted and kneaded. Inside an extrusion die, it was given a layer construction shown in Table 6 (in the case of a multi-layer construction, the individual layers were joined within the extrusion die) and extruded in a cylindrical parison (in the case of a multi-layer construction, coextruded in a cylindrical multi-layer parison) 40 mm in outside diameter and 2 mm in overall wall thickness. This extruded parison was tightly enclosed in a split type metal mold and blow molded therein with compressed air. Consequently, there was obtained a shaped article comprising a bellows portion and connecting portions formed at the opposite ends of the bellows portion.

The shaped article had a length of 200 mm, a diameter of 60 mm at the ridge and a diameter of 45 mm at the groove respectively of the bellows portion, a pitch of 11.5 mm, and an average wall thickness of 0.7 mm. In Examples 7 and 10, the shaped articles were each in a two-layer construction comprising an inner layer and an outer layer. In Examples 8 and 9, the shaped articles were each in a three-layer construction comprising an inner, an intermediate, and an outer layer. In Comparative Experiment 4, the shaped article were composed solely of soft PVC. The layer constructions of the shaped articles of the working examples of this invention and Comparative Experiment 4 are shown in Table 6.

Figure 3:
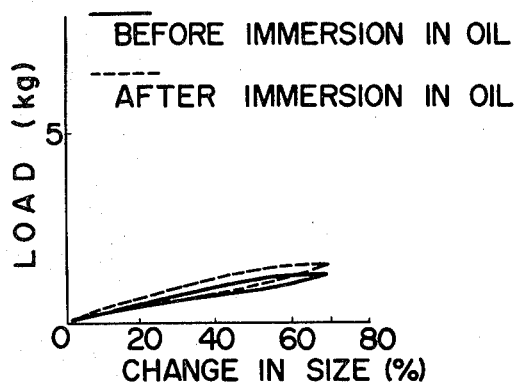
FIGS. 3 (A) through (E) are hysteresis curves obtained of the elastic shaped articles prepared in Examples 7 through 10 and Comparative Experiment 4.
Figure 3:
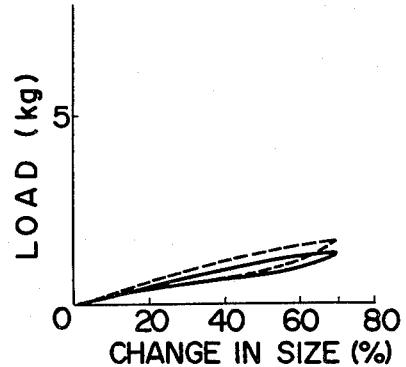
Figure 3:
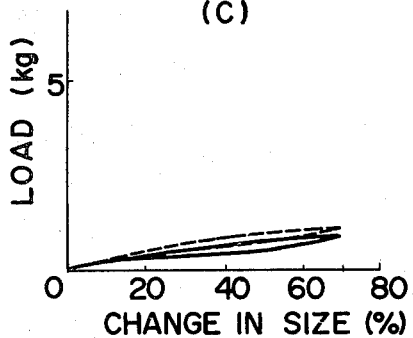
Figure 3:
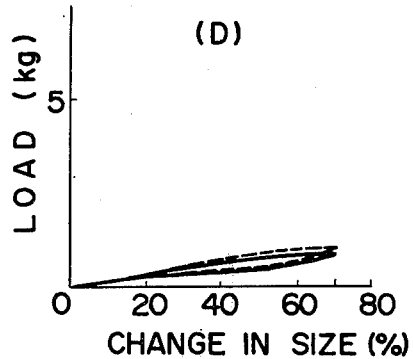
Figure 3:
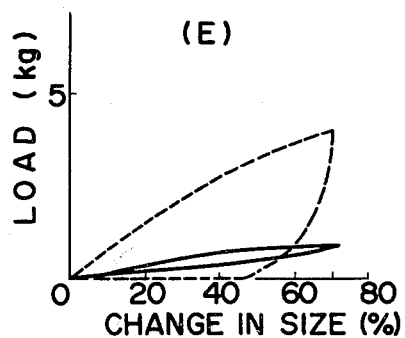

The data of the physical properties obtained of the shaped articles of the working examples and Comparative Experiment 4 are shown in Table 7 and the hysteresis curves obtained of the shaped articles of Examples 7, 8, 9 and 10 are indicated in FIGS. 3(A), (B), (C) and (D) respectively and the hysteresis curve obtained of the shaped article of Comparative Experiment 4 is indicated in FIG. 3 (E). In the graphs of FIG. 3, the continuous lines represent the data obtained of the respective shaped articles before their immersion in oil and the dotted lines the data of the same respective shaped articles after their immersion in oil.

TABLE 5

| Kind | Composition | Parts by weight |
|---|---|---|
| TE-(1) | Polyester type elastomer "PELPRENE P-70B" | |
| TE-(2) | Polyester type elastomer "HYTREL HTG-4275" | |
| TE-(3) | Polyurethane type elastomer "ELASTOLLAN E-585" | |
| TE-(4) | Polyamide type elastomer "DIAMIDE PAE*[(1)] X-3798" | |
| Soft PVC-(1) | Polyvinyl chloride ($\bar{P}$ 3,000) | 100 |
| | Plasticizer (adipic acid-propylene glycol type, $\bar{M}$ 2,000) | 100 |
| | Calcium carbonate | 20 |
| | Epoxidized soybean oil | 3 |
| | Zinc calcium (heat stabilizer) | 2 |
| Soft PVC-(2) | Polyvinyl chloride ($\bar{P}$ 2500) | 100 |
| | Plasticizer (adipic acid-propylene glycol type, $\bar{M}$ 1,000) | 70 |
| | Talc | 20 |
| | Epoxidized soybean oil | 3 |
| | Zinc calcium (heat stabilizer) | 2 |
| Soft PVC-(3) | Polyvinyl chloride ($\bar{P}$ 3,000) | 100 |
| | Plasticizer (sebacic acid-propylene glycol type, $\bar{M}$ 2,000) | 100 |
| | Calcium carbonate | 20 |
| | Epoxidized soybean oil | 3 |
| | Zinc calcium (heat stabilizer) | 2 |
| Soft PVC-(4) | Polyvinyl chloride ($\bar{P}$ 2,500) | 100 |
| | Plasticizer (adipic acid-propylene glycol type, $\bar{M}$ 1,200) | 70 |
| | Calcium carbonate | 20 |
| | Epoxidized soybean oil | 3 |
| | Zinc calcium (heat stabilizer) | 2 |
| Soft PVC-(5) | Polyvinyl chloride ($\bar{P}$ 2,500) | 100 |
| | D.O.P. (di-2-ethylhexyl phthalate, $\bar{M}$ 390) | 70 |
| | Calcium carbonate | 20 |
| | Epoxidized soybean oil | 3 |
| | Zinc calcium (heat stabilizer) | 2 |

*[(1)]DIAMIDE PAE X-3798: trademark of Daicel Chemical Co. for polyamide type elastomer.

TABLE 6

| Construction | Examples | | | | Comparative Experiment |
|---|---|---|---|---|---|
| | 7 | 8 | 9 | 10 | 4 |
| Outer layer | TE-(1) | TE-(2) | TE-(3) | TE-(4) | |
| Intermediate layer | — | Soft PVC-(2) | Soft PVC-(3) | — | Soft PVC-(5) |
| Inner layer | Soft PVC-(1) | TE-(2) | TE-(3) | Soft PVC-(4) | |
| Wall thickness ratio | | | | | |

TABLE 6-continued

|  | Examples | | | | Comparative Experiment |
|---|---|---|---|---|---|
|  | 7 | 8 | 9 | 10 | 4 |
| Outer layer | 20 | 10 | 15 | 30 | |
| Intermediate layer | — | 80 | 70 | — | |
| Inner layer | 80 | 10 | 15 | 70 | |

TABLE 7

| Properties | Examples | | | | Comparartive Experiment |
|---|---|---|---|---|---|
|  | 7 | 8 | 9 | 10 | 4 |
| Tensile strength (kg/cm hu 2) | 244 | 273 | 281 | 178 | 165 |
| Elongation (%) | 375 | 425 | 460 | 340 | 282 |
| Tear strength (kg/mm) | 97 | 119 | 98 | 78 | 43 |
| Pierce strength (kg/mm) | 2.6 | 3.0 | 5.1 | 2.4 | 1.5 |
| Thermal resistance (%) | 6.8 | 5.6 | 6.9 | 7.3 | 17.4 |
| Hardness (before immersion) | 87 | 88 | 82 | 83 | 78 |
| (after immersion) | 88 | 88 | 84 | 84 | 98 |
| Elastic recovery of bellows | | | | | |
| (before immersion) | 85 | 83 | 89 | 82 | 80 |
| (after immersion) | 82 | 82 | 83 | 82 | 8 |

The test for hardness and that for elastic recovery of bellows were determined by the following testing methods.

Hardness:
(Before immersion) ASTM D-2240 (Shore A)
(After immersion) JIS K-6301, with the test piece immersed in oil, No. 3, at 120° C. for 70 hours and tested for hardness after the immersion.

Elastic recovery of bellows:
(Before immersion) Same as the testing method described previously.
(After immersion) JIS K-6301, with the test piece immersed in oil, No. 3, at 120° C. for 70 hours and tested for elastic recovery of bellows after the immersion.

It is noted from Table 7 which compares the data of physical properties obtained of the shaped articles of the working examples of this invention with those obtained of the shaped article of Comparative Experiment 4 that the shaped articles formed in the working examples exhibited excellent mechanical strengths such as tensile, tear and pierce strength never attainable by the shaped article formed solely of soft PVC in Comparative Experiment 4. Further it is clear from Table 7 and FIG. 3 that the shaped articles obtained in the working example of this invention showed substantially no change in hardness and elastic recovery of bellows before and after immersion in oil. In contrast, the shaped article obtained in Comparative Experiment 4 showed notable changes in hardness and elastic recovery of bellows before and after immersion in oil. After the immersion in oil, this shaped article showed greatly increased hardness and notably lowered elastic recovery of bellows. These test results indicate that in the shaped articles obtained in accordance with this invention, the plasticizer in the soft PVC layer is prevented from passing into the TE layer and the flexibility and elasticity inherently possessed by soft PVC are retained intact and the oil resistance and mechanical strengths inherent in TE are retained intact even under harsh conditions. Thus, the present invention is capable of producing elastic shaped articles of outstanding properties.

What we claim is:

1. An elastic shaped article of a laminated construction of at least two layers, comprising (a) a layer of soft polyvinyl chloride incorporating 30 to 220 parts by weight of a plasticizer per 100 parts by weight of polyvinyl chloride having an average polymerization degree of 800 to 12,000 and (b) a layer of at least one thermoplastic elastomer selected from the group consisting of polyester type elastomers, polyurethane type elastomers and polyamide type elastomers.

2. An elastic shaped article according to claim 1, wherein said soft polyvinyl chloride incorporates 40 to 200 parts by weight of said plasticizer per 100 parts by weight of polyvinyl chloride of a high polymerization degree falling in the range of 1,300 to 10,000.

3. An elastic shaped article according to claim 1, wherein said plasticizer incorporated in said soft polyvinyl chloride is a plasticizer having an average molecular weight of at least 700.

4. An elastic shaped article according to claim 3, wherein said plasticizer is a polyester type plasticizer of an epoxy type plaxticizer.

5. An elastic shaped article according to claim 1 or claim 3, wherein said soft polyvinyl chloride has lower hardness than said thermoplastic elastomer.

6. An elastic shaped article according to claim 5, wherein the hardness of said soft polyvinyl chloride is 30 to 93 and that of said thermoplastic elastomer 60 to 99, both by the Shore A Scale.

7. An elastic shaped article according to claim 1 or claim 3, wherein said elastic shaped article possesses hardness of 60 to 99 by the Shore A Scale.

8. An elastic shaped article according to claim 1 or claim 3, wherein the overall wall thickness ratio of the layer of said thermoplastic elastomer to the layer of said soft polyvinyl chloride falls in the range of 90:10 to 0.5:99.5.

9. An elastic shaped article according to claim 1 or claim 3, wherein the overall wall thickness ratio of the layer of said thermoplastic elastomer to the layer of said soft polyvinyl chloride falls in the range of 50:50 to 0.5:99.5.

10. An elastic shaped article according to claim 1 or claim 3, wherein the layer of said soft polyvinyl chloride and the layer of said thermoplastic elastomer are laminated by co-extrusion.

11. An elastic shaped article according to claim 10, which comprises a three-layer construction having an inner and an outer layer each of thermoplastic elastomer and an intermediate layer of soft polyvinyl chloride.

12. An elastic shaped article according to claim 10, which comprises a three-layer construction having an inner and an outer layer each of a polyester type elastomer and an intermediate layer of soft polyvinyl chloride.

13. An elastic shaped article according to claim 10, which comprises a three-layer construction having an inner and an outer layer each of a polyurethane type elastomer and an intermediate layer of soft polyvinyl chloride.

14. An elastic shaped article according to claim 1 or claim 3, which is molded in the shape of a hollow tube by the blow molding method.

15. An elastic shaped article according to claim 14, wherein said hollow tube has its opposite ends shaped so as to come into intimate contact with the corresponding ends of members to be joined therewith and the barrel of said hollow tube intervening between said opposed ends has bellows-structure.

16. An elastic shaped article according to claim 15, wherein the elastic shaped article is an automotive boot such as a shock absorber boot, a rack and pinion steering gear boot, a suspension strut boot, or a constant velocity joint boot.

* * * * *